July 14, 1936.  E. M. WHEELOCK  2,047,347
AUTOMOBILE STORAGE DEVICE
Original Filed Oct. 31, 1929    5 Sheets—Sheet 3
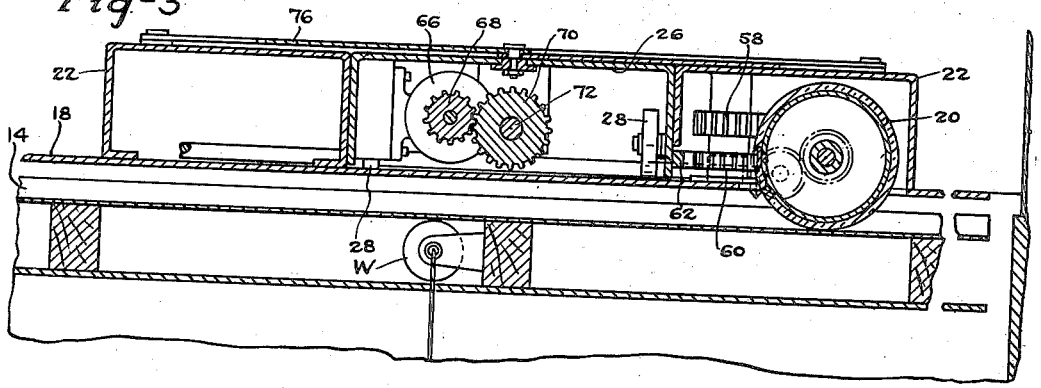
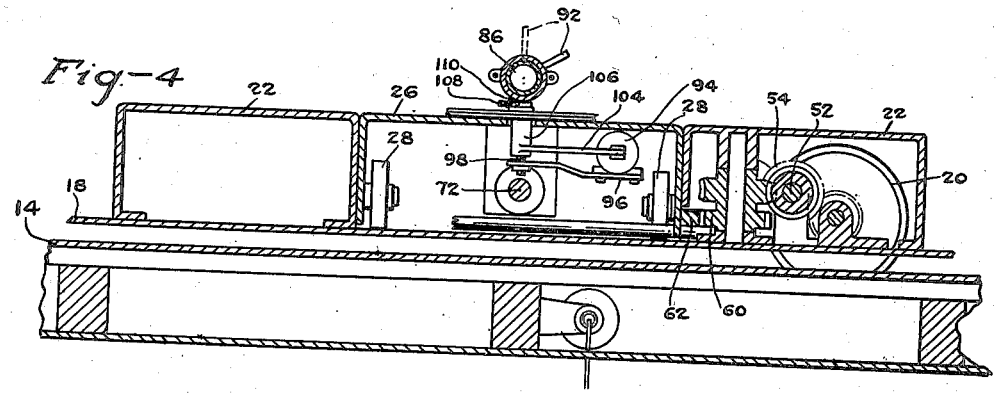
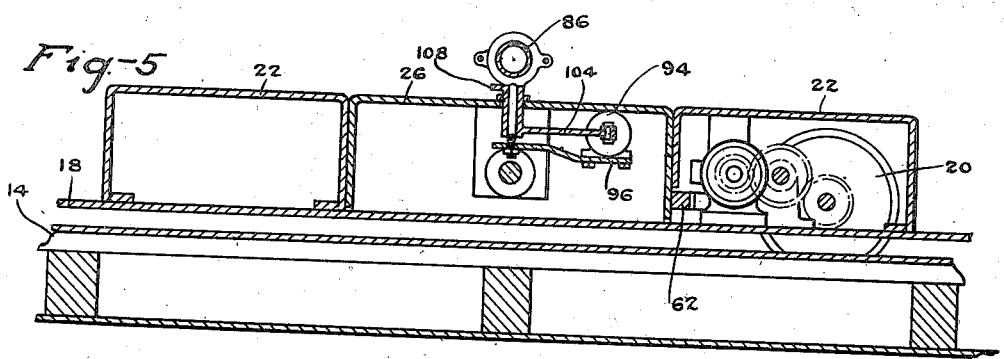
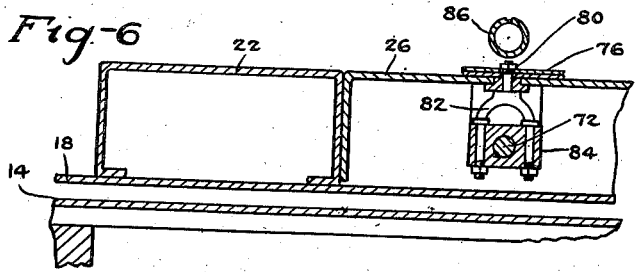
Inventor:
E. M. Wheelock.
By Whiteley and Ruckman
Attorneys.

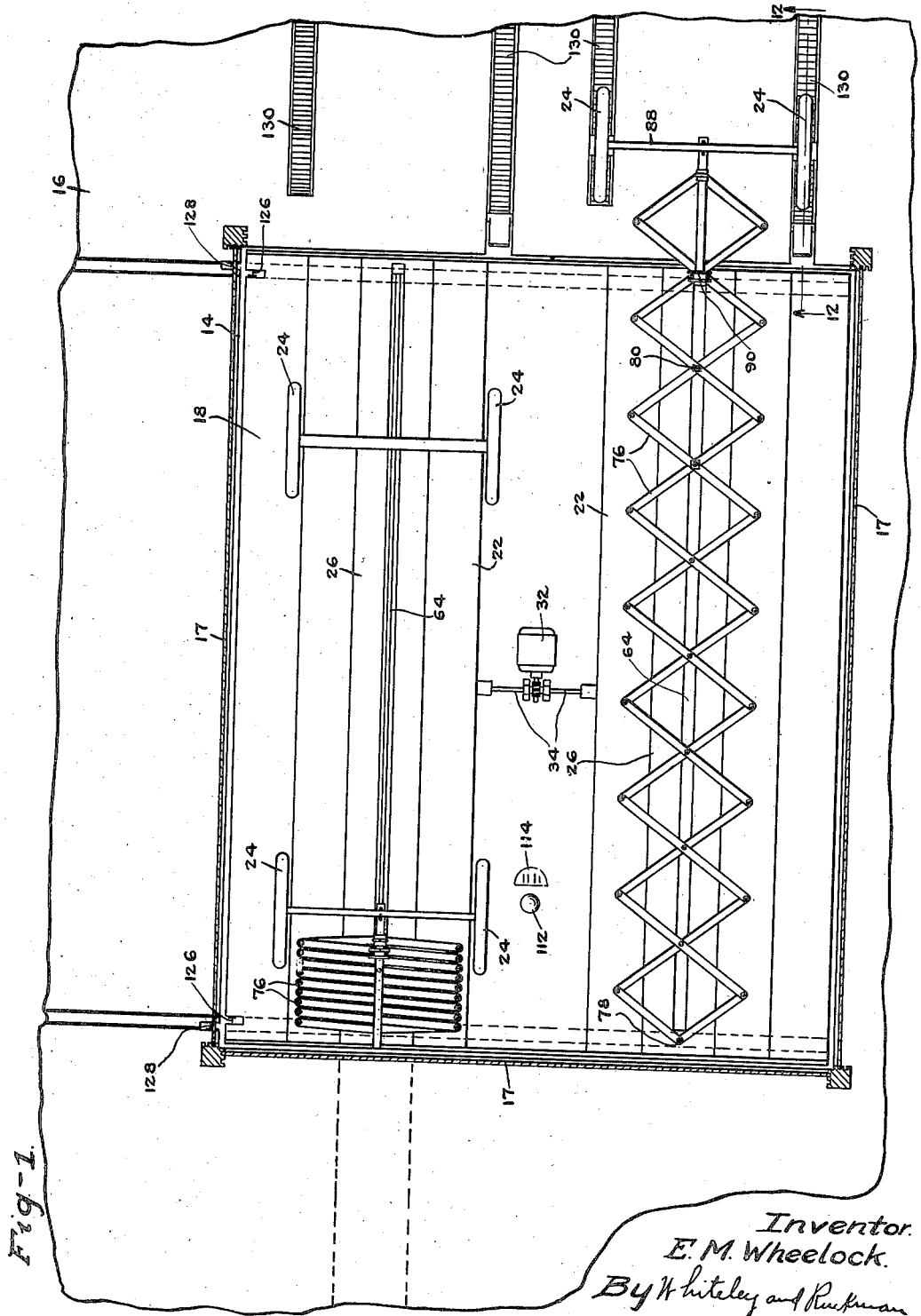

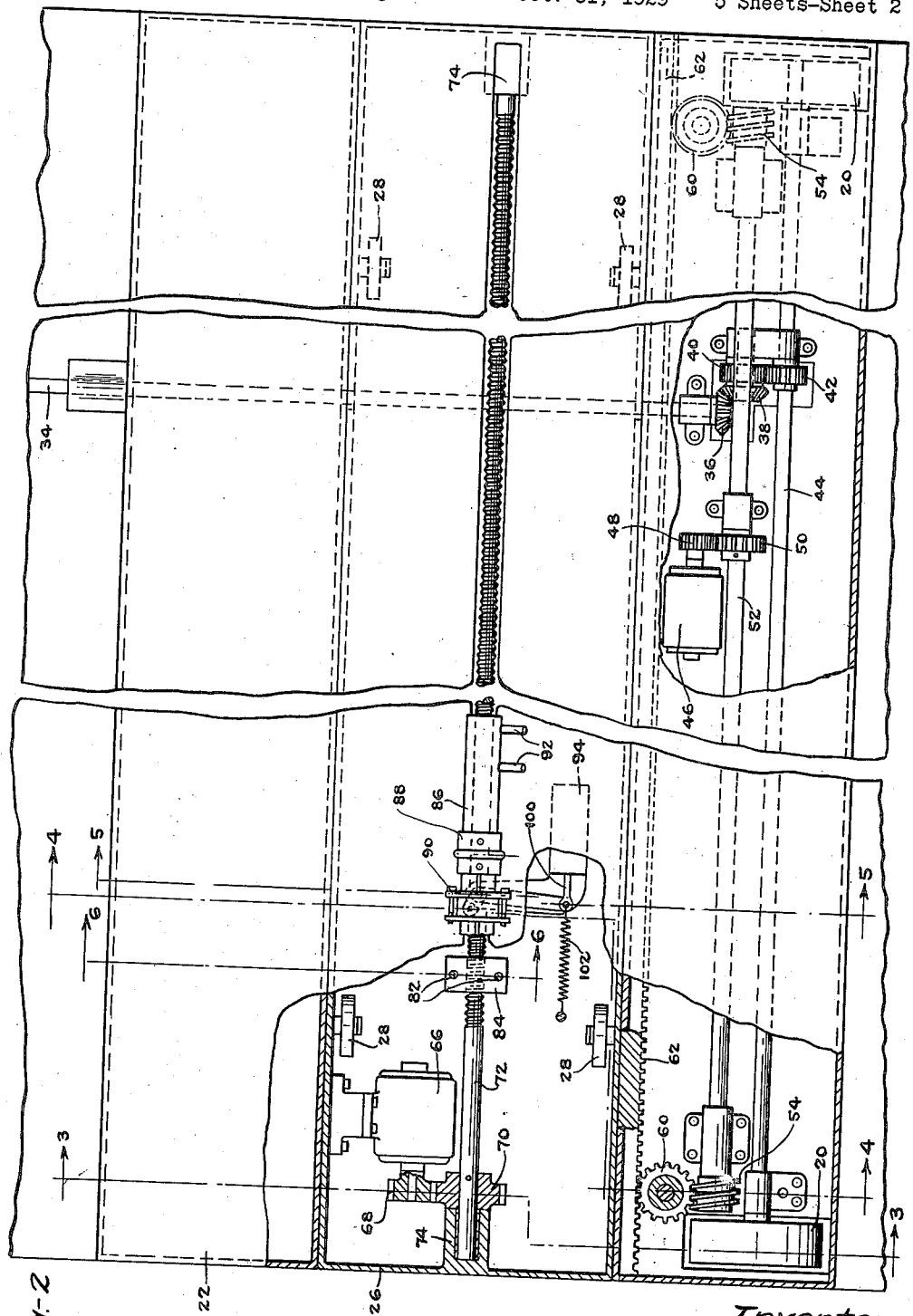

July 14, 1936.          E. M. WHEELOCK          2,047,347
AUTOMOBILE STORAGE DEVICE
Original Filed Oct. 31, 1929    5 Sheets-Sheet 4
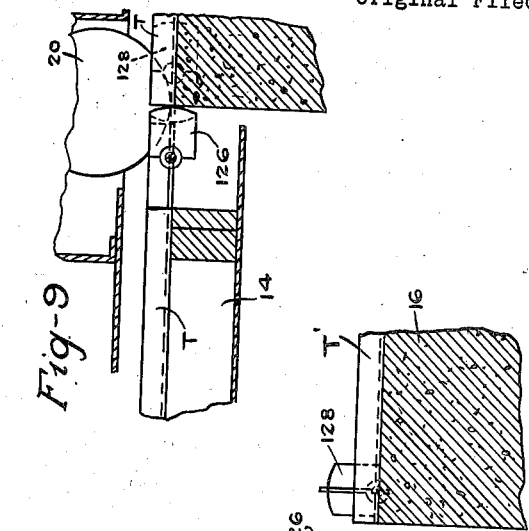
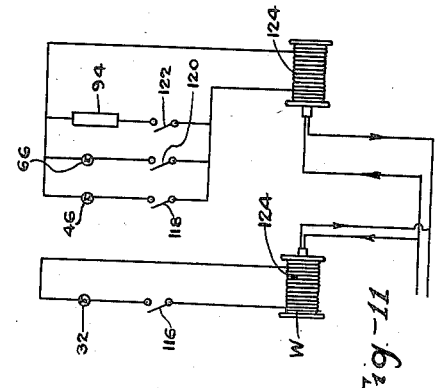
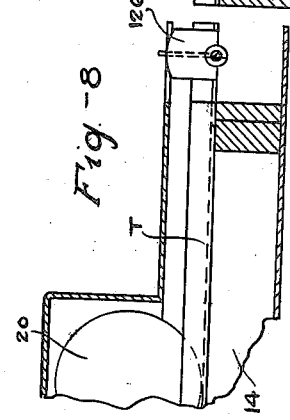
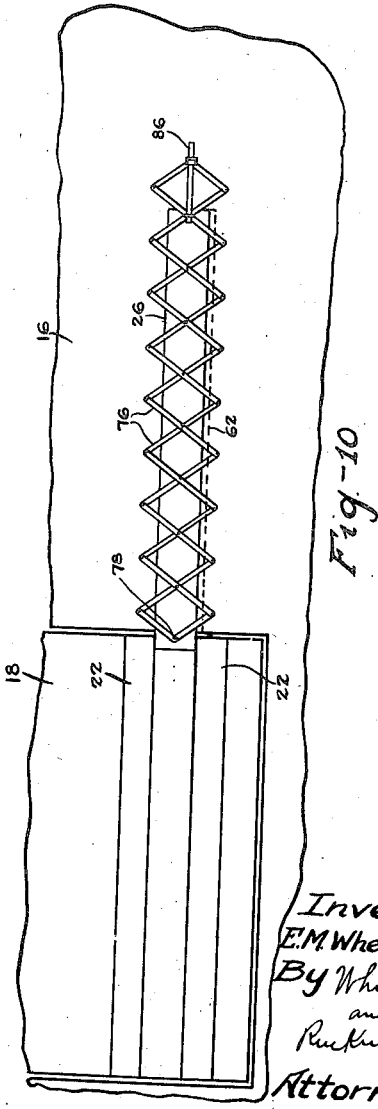
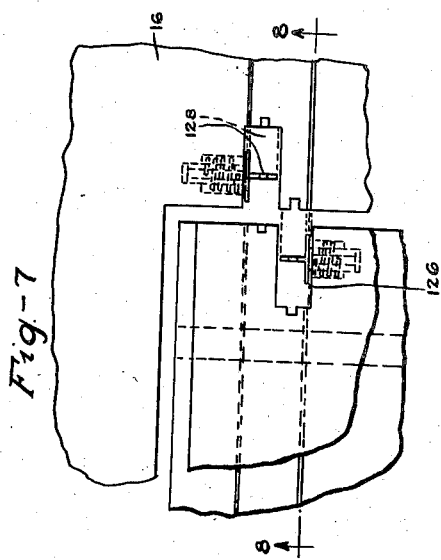
Inventor.
E. M. Wheelock
By Whiteley
and
Ruckman
Attorneys.

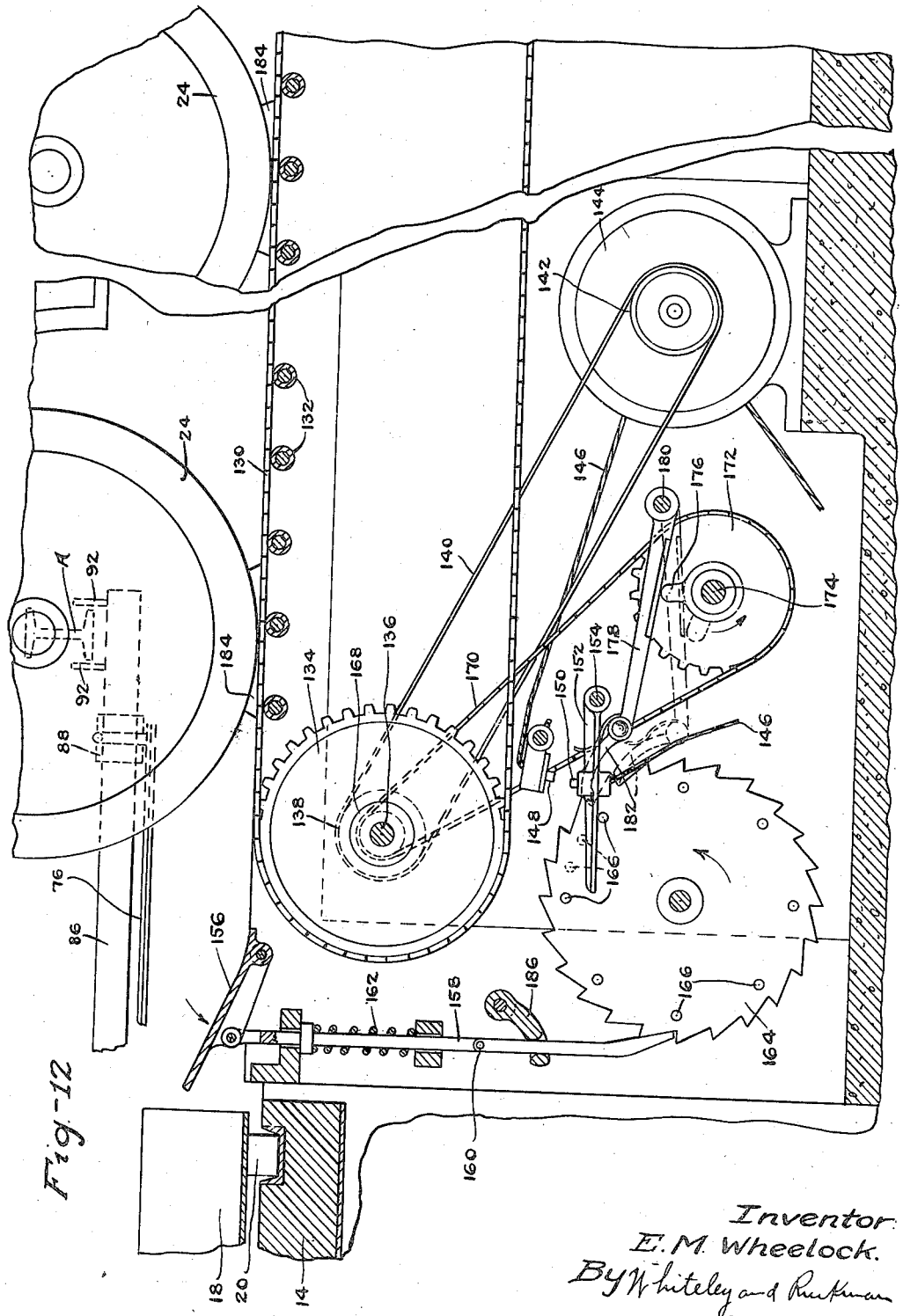

Patented July 14, 1936

2,047,347

UNITED STATES PATENT OFFICE 2,047,347

AUTOMOBILE STORAGE DEVICE

Edwin M. Wheelock, Minneapolis, Minn.

Application October 31, 1929, Serial No. 403,776
Renewed December 6, 1935

12 Claims. (Cl. 214—16.1)

My invention relates to automobile storage devices, and an object is to provide power operated mechanism by means of which automobiles may be placed upon and moved off from elevators in order to facilitate the storage of automobiles and their removal in buildings having a plurality of floors, the power operated mechanism being mounted on a truck adapted to be carried by the elevator so as to be readily used in connection with the various floors of the building. My device may be used in connection with standard elevators except that I prefer to employ an elevator platform which is open on its four sides with slidable fire doors located on the various floors so that a fireproof elevator shaft is produced when the doors are closed, it being understood that the opening of the doors permits automobiles to be delivered from and upon any one of the four sides of the elevator platform. In order to adapt the device for this purpose, I propose to mount the power mechanism upon a truck which may be run off and onto the elevator in two opposite directions and to provide the truck with extensible mechanism by means of which the automobiles may be pushed off from and pulled upon the truck in two opposite directions at right angles to the direction of movement of the truck, so that automobiles can be delivered from and upon the elevator with relation to all of its four sides. Another object is to provide power mechanism which may be readily controlled electrically by an operator for operating the device in the manner just stated. Another object is to provide means for bridging the rails between the elevator and the alleyways on the floors in order to provide smooth movement for the wheels so that there will be no jolting when the automobiles are moved between the elevator and the floor. While I have shown my truck mounted on wheels, it is to be understood that my invention is not limited to the use of wheels since the truck might be of the caterpillar or belt type which would not require any special bridging means between the elevator and the floor. Another object is to provide mechanism for facilitating the positioning of automobiles with relation to the elevator when such automobiles are entering the garage.

The full objects and advantages of my invention will appear in connection with the detailed description thereof, and the novel features of my inventive idea will be particularly pointed out in the claims.

In the accompanying drawings which illustrate an embodiment of my invention,—

Fig. 1 is a top plan view of the device showing three of the doors which are adjacent an elevator in closed position and with the fourth door open. Fig. 2 is an enlarged top plan view with parts of a housing broken away and a lazy-tongs device removed. Fig. 3 is a view in vertical section on the line 3—3 of Fig. 2. Fig. 4 is a view in vertical section on the line 4—4 of Fig. 2. Fig. 5 is a view in vertical section on the line 5—5 of Fig. 2. Fig. 6 is a view in vertical section on the line 6—6 of Fig. 2. Fig. 7 is a fragmentary plan view taken at one corner of the elevator. Fig. 8 is a view in vertical section on the line 8—8 of Fig. 7. Fig. 9 is a view corresponding to Fig. 8 but showing an automobile being moved off the elevator. Fig. 10 is a fragmentary plan view showing a ram and lazy-tongs in extended position. Fig. 11 is a wiring diagram view. Fig. 12 is a view in vertical section showing a device which may be used to take automobiles into position adjacent the elevator.

Referring to the construction shown in the drawings, the numeral 14 designates an elevator platform which may be raised and lowered in any well known manner so as to register substantially with the floors of a storage garage or building, one of the floors being indicated by the numeral 16. The floors adjacent the elevator are provided with slidable fire doors 17, there being preferably one for each of the four sides of the elevator. A truck indicated at 18 has wheels 20 at the four corners thereof so that it may be run upon and off the elevator platform. Two housing members designated 22 are secured to the truck, each of these members as an entirety being of such width that it may be straddled by the wheels of an automobile as will be understood from Fig. 1 in which the numeral 24 designates the wheels of an automobile. Since the two housing members and the mechanism associated therewith are alike, a detailed description of one will be sufficient. The housing member 22 consists of two elements spaced from each other as will be understood from Figs. 3 to 6. Between the pair of housing elements, a ram 26 is mounted and is provided with wheels 28 so that it may be slid back and forth between the housing elements, it being noted that the ram also is in the form of a housing.

Mounted on the truck between the two housing members 22, there is a reversible electric motor 32 as shown in Fig. 1 whose shaft is geared so as to operate shafts 34, one for each housing member. The outer ends of the shafts 34 carry bevel gears 36 meshing with bevel gears 38 secured to spur gears 40 meshing with spur gears 42. The spur gears 42 are secured to shafts 44 upon the ends of which the truck wheels 20 are secured. It will be understood, of course, that there are two of the shafts 44, one for each end of the truck and that by operating the motor 32 in one direction or the other, the truck may be moved off from and onto the elevator. Mounted within one element of the housing 22 as shown in Fig. 2, there is a reversible electric motor 46 whose shaft carries a spur gear 48 meshing with a spur gear 50 secured to a shaft 52. Secured to the ends of the shaft 52, there are worms 54 which mesh with worm gears 58, integral with pinions 60 as shown in Fig. 4. The pinions 60 mesh with a rack 62 secured to one side of the ram 26 so that by operating the motor 46 in one direction or the other, the ram may be moved back and forth. A longitudinal slot 64 as shown in Fig. 1, extends through the top of the ram 26 from a point near one end thereof to the other end thereof. Secured to the inside of the ram 26, there is a reversible electric motor 66 whose shaft carries a spur gear 68 meshing with a spur gear 70 secured to one end of a threaded rod 72 whose ends are mounted in bearings 74 carried by the ram 26. Directly above the ram, there is a lazy-tongs device consisting of a plurality of crossed links 76 pivoted to each other in the usual manner, it being understood that this device is attached to one end of the ram by the rear end pivot 78. As shown in Fig. 6, the links of the lazy-tongs where they cross each other toward the forward portion, carry a bolt 80 which extends down through the slot 64 in the ram and is secured to a U-shaped member 82 which holds a nut member 84 through which the threaded rod 72 passes. It is evident that by rotating the rod 72 in one direction or the other by the reversible motor 66, the lazy-tongs will be extended as shown in the lower portion of Fig. 1 or will be retracted as shown in the upper portion of this figure. A tube 86 is rotatably mounted in collars 88 carried by the forward links of the lazy-tongs and is slidable in collars 90 carried by next to the forward links. The tube 86 near its forward end carries a number of outstanding projections or pins 92 of which two are shown in Fig. 12 with the front axle A of an automobile fitting between them.

It will be understood that when the lazy-tongs are extended beyond the elevator with the pins 92 extending out horizontally, the tube 86 must be given a movement of rotation to bring these pins upwardly on opposite sides of the axle so that when the lazy-tongs are retracted, the automobile will be pulled onto the truck which is on the elevator. In order to thus rotate the tube 86, a solenoid 94 is mounted on a base 96 held for movement with the lazy-tongs by a bolt 98 passing up through the slot 64. The solenoid has a core 100 which when the solenoid is not energized is held outwardly by a spring 102 as shown in Fig. 2. An arm 104 pivoted to the solenoid core carries at its outer end a sleeve 106 as shown in Fig. 5 which rotatably surrounds the bolt 98 and also passes up through the slot 64. The upper end of the sleeve 106 is provided with a projection 108 which engages a pin 110 extending out from the tube 86 so that when the solenoid is energized, the pins 92 are brought into the upright position shown in Fig. 12. In Fig. 1, an operator's seat 112 is shown adjacent a stand 114 for the control levers by which switches now to be referred to are operated. By referring to Fig. 11, it will be seen that the motor 32 is in a circuit having a switch 116 and that the motors 46 and 66 and the solenoid 94 are in a circuit having switches 118, 120, 122 by which they are controlled respectively. The wires for these circuits are mounted on reels 124 carried by the elevator in order that the elevator with the truck thereon may move up and down. The manner in which the electric connections may be made is disclosed in my Patent No. 1,849,470.

In order that the truck may move smoothly between the elevator and the floor without jolting, U-shaped bridge members 126 and 128 are provided for bridging the space between the tracks T on the elevator and the tracks T' on the floor. These bridge members are normally held in upright position by springs or weights as shown in Fig. 8. When the truck is moving off the elevator, the bridge members are tilted into horizontal position as shown in Fig. 9. When the truck is moving onto the elevator, the bridge members will be tilted in the opposite direction.

Fig. 12 in connection with Fig. 1 shows mechanism for facilitating the positioning of automobiles with relation to the elevator when such automobiles are entering the garage in order to be stored. Pairs of endless chains or belts 130 of any suitable length and placed substantially level with the floor and supported from sagging in any suitable manner as by a multiplicity of rollers 132, are trained around sprocket wheels such as indicated by the numeral 134. The sprocket wheel 134 is secured to a shaft 136 which carries a pulley 138 around which is trained a belt 140 which is also trained around a pulley 142 secured to the shaft of an electric motor 144. This motor is in a circuit 146 included in which is a switch consisting of a fixed contact 148 and a movable contact 150 carried by an arm 152 pivoted at 154. Assuming that an automobile is in the position shown ready to be pulled upon the truck 18 carried on the elevator platform 14, the front wheel of the automobile passes over and depresses a pivoted plate 156. A depending pawl rod 158 is pivoted to the lower side of the plate 156, the pawl rod being in two parts hinged at 160 and the pawl normally being held up by a spring 162. When the pawl 158 is depressed by the front wheel of the automobile, it rotates a ratchet wheel 164, a distance corresponding to that between two of the teeth. When the pawl 158 is depressed by the rear wheel of the automobile, the ratchet wheel 164 is again rotated the distance of one tooth. Pins 166 carried by the ratchet wheel 164 are so arranged as to engage the arm 152 so that the contact 150 is now brought into engagement with the contact 148, thereby causing the motor to be energized and move the chains 130 toward the elevator. The shaft 136 carries a pulley 168 around which is trained a belt or chain 170 which is also trained around a wheel 172 secured to a shaft 174. This shaft carries a cam 176 which when rotated, engages an arm 178 pivoted at 180. The free end of the arm 178 carries a pivoted pawl 182 which engages and turns the ratchet wheel 164 the distance of one tooth, thereby moving the pin 166 from engagement with the arm 152 so that the contact 150 drops and the motor 144 stops. It will be understood that the movement imparted to the chains 130 is so coordinated as to bring another automobile into the position shown in Fig. 12 ready to be pulled upon the truck by the extensible mechanism. Blocks indicated at 184 and attached to the chains 130 may be used to determine the proper positioning of the automobile wheels. A manually operated rocker arm 186 engaging the pawl rod 158 may be swung upwardly to disengage the pawl from the ratchet wheel. When this is done, no movement of the chains will be caused so that now it is necessary to drive each automobile into the proper position adjacent the elevator to be engaged by the extensible mechanism.

The operation and advantages of my invention have to a large extent already been set forth. In the use of the device, an automobile on the ground floor is brought close to the elevator shaft so that the automobile wheels occupy the position shown in Fig. 12. The elevator platform is then lowered so as to bring the truck thereon into register with the ground floor unless it is already in this position. The ram and the lazy-tongs are then extended into the proper position and upon turning the tube 86, the axle A will be disposed between the pins 92 so that the automobile can be pulled upon the truck by retracting the ram and the lazy-tongs. When the automobile has been taken to the desired floor, the ram and the lazy-tongs may be operated to push the automobile from the same side as that on which it entered or the ram may be operated in the other direction to remove the automobile from the other side. If it is desired to remove the automobile from either of the other two sides of the elevator, then the truck carrying the automobile is run off from the elevator upon the floor. The automobile may then be moved off the truck into the desired stall. In the construction shown, two automobiles may be carried at one time on the truck.

I claim:

1. An automobile storage device for buildings having a plurality of floors, comprising an elevator, a truck adapted to be carried by said elevator, a housing mounted on said truck, extensible mechanism mounted outside of said housing for pushing and pulling automobiles, and operating means for said extensible mechanism mounted within said housing.

2. An automobile storage device for buildings having a plurality of floors, comprising an elevator a truck adapted to be carried by said elevator, a housing mounted on said truck, said housing containing a longitudinal slot, a traveling member mounted in said housing, a motor for moving said traveling member in forward and backward direction, extensible mechanism mounted outside of said housing for pushing and pulling automobiles, and a member passing through said slot connecting said extensible mechanism and said traveling member.

3. An automobile storage device for buildings having a plurality of floors, comprising an elevator, a truck adapted to be carried by said elevator, a housing mounted on said elevator, said housing containing a longitudinal slot, a traveling member mounted in said housing, a motor for driving said traveling member backward and forward, a lazy-tongs device mounted outside of said housing for pushing and pulling automobiles, and a member passing through said slot connecting said lazy-tongs device and said traveling member.

4. An automobile storage device for buildings having a plurality of floors, comprising an elevator, a truck adapted to be carried by said elevator, a housing mounted on said elevator, said housing containing a longitudinal slot, a traveling member mounted in said housing, a motor for driving said traveling member backward and forward, a lazy-tongs device mounted outside of said housing for pushing and pulling automobiles, a member passing through said slot connecting said lazy-tongs device and said traveling member, and a member movably connected with said lazy-tongs device and adapted to be projected beyond the elevator for engaging an automobile.

5. An automobile storage device for buildings having a plurality of floors, comprising an elevator, a truck adapted to be carried by said elevator, a lazy-tongs device mounted on said truck, a motor for expanding and contracting said lazy-tongs device, a rotatable member carried by the forward portion of said device, projections on the forward end of said member, and mechanism for giving said member a rotatable movement for engaging and disengaging said projections with relation to the axle of an automobile.

6. An automobile storage device for buildings having a plurality of floors, comprising an elevator, a truck adapted to be carried by said elevator, a slidable ram mounted on said truck, a lazy-tongs device mounted on said ram, and means for operating said lazy-tongs device.

7. An automobile storage device for buildings having a plurality of floors, comprising an elevator, a truck adapted to be carried by said elevator, a slidable ram mounted on said truck, a lazy-tongs device mounted on said ram, and means for independently operating said ram and said lazy-tongs device.

8. An automobile storage device for buildings having a plurality of floors, comprising an elevator, extensible mechanism for pushing an automobile from and pulling it on the elevator consisting of a plurality of inter-connected relatively movable parts adapted for right line movement and nested together on the elevator in their retracted position, and means for projecting said mechanism beyond the elevator in two opposite directions.

9. An automobile storage device for buildings having a plurality of floors, comprising an elevator, a slidable ram mounted on said elevator, and a lazy-tongs device mounted on said ram.

10. An automobile storage device for buildings having a plurality of floors, comprising an elevator, a slidable ram mounted on said elevator, a lazy-tongs device mounted on said ram, means for projecting said lazy-tongs device from one side of said elevator, and means for projecting said ram from the other side of said elevator.

11. An automobile storage device for buildings having a plurality of floors, comprising an elevator, an extensible device operable longitudinally of an automobile on the elevator, and means for projecting said device in two opposite directions a distance at least as great as the length of an automobile to a point beyond the limits of the elevator floor and for retracting it for pushing an automobile from and pulling it onto the elevator.

12. An automobile storage device for buildings having a plurality of floors, comprising an elevator, mechanism for loading automobiles onto said elevator, feeding mechanism for placing automobiles in position adjacent said elevator for coaction with said loading mechanism, and controlling means for said feeding mechanism operated by the movement of automobiles onto said elevator.

EDWIN M. WHEELOCK.